(12) United States Patent
Brodsky

(10) Patent No.: US 7,577,274 B2
(45) Date of Patent: Aug. 18, 2009

(54) SYSTEM AND METHOD FOR COUNTING CARS AT NIGHT

(75) Inventor: Tomas Brodsky, Croton on Hudson, NY (US)

(73) Assignee: Honeywell International Inc., Morristown, NJ (US)

( * ) Notice: Subject to any disclaimer, the term of this patent is extended or adjusted under 35 U.S.C. 154(b) by 861 days.

(21) Appl. No.: 10/772,892

(22) Filed: Feb. 4, 2004

(65) Prior Publication Data

US 2005/0058323 A1 Mar. 17, 2005

Related U.S. Application Data

(60) Provisional application No. 60/502,823, filed on Sep. 12, 2003.

(51) Int. Cl.
*G06K 9/00* (2006.01)
*G08G 1/01* (2006.01)
*G08G 1/017* (2006.01)
*G08G 1/054* (2006.01)

(52) U.S. Cl. ................. 382/103; 382/104; 340/933; 340/937; 348/143; 348/148; 348/149

(58) Field of Classification Search ............. 348/143, 348/148, 149; 340/933, 937; 382/103, 104
See application file for complete search history.

(56) References Cited

U.S. PATENT DOCUMENTS 5,296,852 A * 3/1994 Rathi ...................... 340/933
5,365,603 A * 11/1994 Karmann ................. 382/291
5,535,314 A * 7/1996 Alves et al. .............. 382/165
6,037,976 A * 3/2000 Wixson .................... 348/122
6,442,474 B1 * 8/2002 Trajkovic et al. .......... 701/117
2006/0274917 A1 * 12/2006 Ng et al. ................... 382/103

OTHER PUBLICATIONS

Cucchiara et al., Vehicle Detection under Day and Night Illumination, 1999, Special Session on vehicle traffic and surveillance.*

* cited by examiner

*Primary Examiner*—John B Strege
(74) *Attorney, Agent, or Firm*—Husch Blackwell Sanders Welsh & Katz

(57) ABSTRACT

A vehicle identification system distinguishes vehicles in reduced visibility conditions based on the characteristic projection patterns associated with vehicle headlights and their reflections. Recognizing that the appearance of reflections of headlight beams in a camera image is highly dependent upon the angle of incidence/reflection relative to the camera, whereas the appearance of the headlights in the camera image is relatively consistent, the vehicle identification system distinguishes vehicles from their reflections based on the tracks of the illumination patterns in a series of images. In a first embodiment, headlights are distinguished from reflections based on a length of the tracks. In a second embodiment, recognition zones are selected as regions in the camera image that are not likely to provide reflections from normally aligned headlight beams. Pattern-matching and motion-correlation techniques are also used to identify the track of each vehicle in prior and subsequent image frames.

32 Claims, 4 Drawing Sheets

SYSTEM AND METHOD FOR COUNTING CARS AT NIGHT

This application claims the benefit of U.S. Provisional Application 60/502,823, filed 12 Sep. 2003.

BACKGROUND OF THE INVENTION

1. Field of the Invention

This invention relates to the field of computer vision, and in particular to a system and method for counting vehicles on roadways during periods of reduced visibility.

2. Description of Related Art

Cameras are conventionally used to monitor traffic flow. Coupling a video processing system to cameras that monitor traffic flow can facilitate traffic flow analysis and other traffic related studies. Such analyses and studies typically require a determination of the number of vehicles traveling on a particular stretch of road, the number of vehicles entering or exiting a road at a particular intersection, the number of vehicles exhibiting a particular driving pattern, and so on. In order to provide an accurate count of vehicles, each vehicle must be distinguished from each other vehicle, and often the path of each discretely distinguished vehicle must be determined, at least for some finite time or distance.

Image recognition systems are conventionally used to distinguish each vehicle in a video image of a road scene. For example, in a typical image recognition system, an edge-detection algorithm may be used to distinguish shapes in an image; a motion-detection algorithm may be used to distinguish moving shapes in a series of images, and to group lower-level shapes into larger shapes, based on common movement; and a pattern recognition algorithm may be used to identify which of the moving shapes correspond to vehicles. Once the shape is identified as being a vehicle, the location of this particular vehicle in prior and future images can be determined, thereby determining the path of the identified vehicle.

Identifying vehicles in reduced visibility situations, particularly after dark, is particularly problematic. If the monitored segment of roadway is brightly lit, the conventional image recognition algorithms generally operate effectively, but if the segment is not brightly lit, the conventional image recognition algorithms are unable to accurately distinguish vehicles. In a dark environment, colors and/or luminance differences are not distinguishable, and the conventional edge-detection algorithms fail to accurately distinguish shapes that correspond to the shape of the moving vehicles. The conventional motion-detection algorithm will also exhibit anomalous behavior, as items will appear and disappear in sequential images, depending upon their illumination by passing vehicles' headlights. Although pattern-recognition techniques may be employed to distinguish vehicles by distinguishing pairs of uniformly moving headlights, such techniques are susceptible to misidentifications caused by reflections, such as the reflection of headlights on a wet roadway at night.

Typically, to facilitate vehicle identification in reduced visibility systems, infrared cameras or night-vision cameras are employed. Such a deployment of infrared or night-vision cameras increase the cost of such vehicle monitoring systems. If a video system is already deployed, the cost of adding infrared or night-vision devices includes the cost of the additional cameras and their installation, as well as the cost to access and modify the existing installation to facilitate the installation.

BRIEF SUMMARY OF THE INVENTION

It is an object of this invention to provide a system and method that facilitates the identification of vehicles during periods of reduced visibility. It is a further object of this invention to provide such a system and method using conventional video cameras. It is a further object of this invention to facilitate the augmentation of existing video-based traffic monitoring systems to support day and night discrete vehicle identification and tracking.

These objects, and others, are achieved by a vehicle identification system that distinguishes vehicles in reduced visibility conditions based on the characteristic tracks produced by vehicle headlights and their reflections. In a first aspect of this invention, vehicle headlights are distinguished from their reflections based on the length of the tracks produced by each. In a second aspect of this invention, recognition zones within a camera's field of view are identified that facilitate reliable recognition of headlight patterns. Recognizing that vehicle headlights exhibit a characteristic projection pattern, and that the appearance of reflections of headlight beams in a camera image is highly dependent upon the angle of incidence/reflection relative to the camera, whereas the appearance of the headlights in the image is relatively consistent, the recognition zones are selected as regions in the camera image that are not likely to provide reflections from normally aligned headlight beams. Pattern-matching and motion-correlation techniques are also used to identify the track of each vehicle in prior and subsequent image frames.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

The invention is presented herein using the paradigm of a traffic analysis system that is configured to count vehicles on a roadway at night. One of ordinary skill in the art will recognize that the examples presented herein are intended for ease of presentation and understanding, and that the principles presented herein are not limited to this example application.

Figure 1A:
FIG. 1A illustrates an example night scene of a roadway.
Figure 1B:
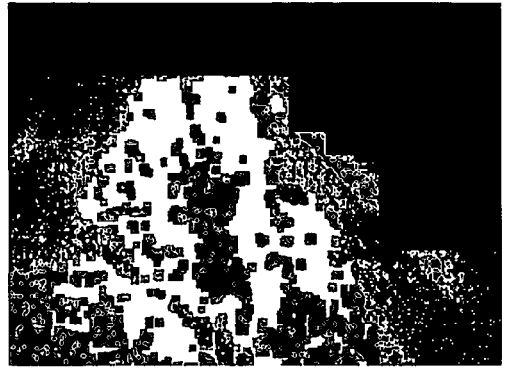
FIG. 1B illustrates a processing of the scene to identify shapes.

FIGS. 1A and 1B illustrate the difficulties associated with attempting to recognize shapes in a typical image of a roadway at night. Because of the reduced overall lighting level, and the contrast provided by vehicle headlights, it is difficult to clearly determine the shape of each vehicle in FIG. 1A.

FIG. 1B illustrates the results of a conventional background-subtraction processing of the image of FIG. 1A. In this example, FIG. 1B is created by detecting differences between the image of FIG. 1A and a reference model of the scene without vehicles. A shadow detection process is also typically employed, to distinguish between actual objects, represented by white pixels, and shadows, represented by gray pixels; black pixels identify pixels that correspond to the reference image. In a daylight scene, the background-subtraction and shadow-detection processes would produce a white image corresponding to each vehicle or other object that is not part of the reference model, with gray pixels identifying shadows. As can be seen, however, in a night scene, the illumination of regions ahead and to the sides of each vehicle produces anomalous and virtually unrecognizable shapes. Even if the gray pixels are ignored, the remaining white images do not appear to be vehicles.

Figure 2A:
FIG. 2A illustrates another example night scene of a roadway.
Figure 2B:
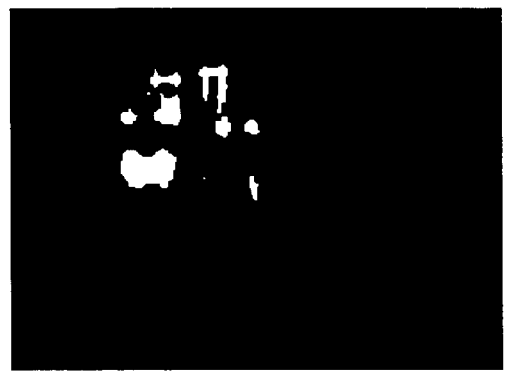
FIG. 2B illustrates a processing of the scene to identify shapes using thresholding.

Thresholding is a technique that is commonly used to reduce the effects caused by the transient illumination of objects, as illustrated in FIGS. 2A-2B. In FIG. 2B, pixels in the image of FIG. 2A that have a luminance level above a given threshold are given a white value, and pixels having a luminance level below the threshold are given a black value. As can be seen, most of the shapes in FIG. 2A that are dimly illuminated by the vehicle headlights are eliminated from the image of FIG. 2B, and only the headlights and the direct reflections of the headlights from the surface are detectable in FIG. 2B. However, as can also be seen, it is difficult to distinguish the objects corresponding to the headlights of the vehicles from their reflections, and the ability of a conventional object-recognition algorithm, or even a human operator, to correctly distinguish each vehicle in the image of FIG. 2B is prone to error.

Figure 3A:
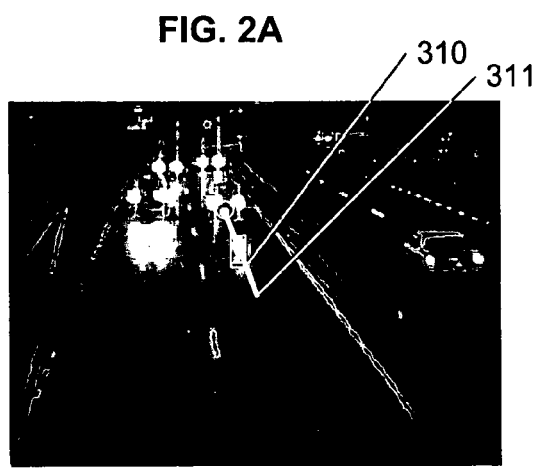
FIGS. 3A and 3B illustrate a time-lapse example night scene of a roadway.
Figure 3B:
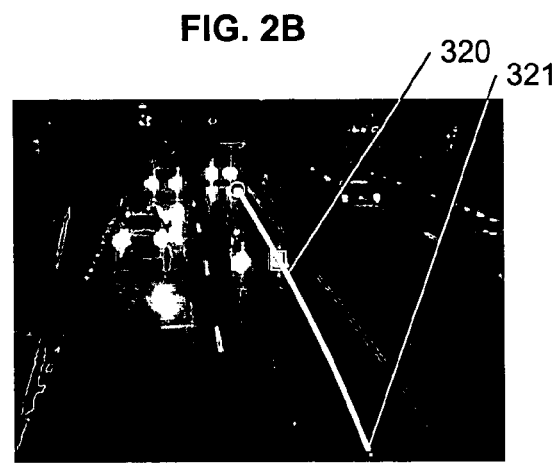

FIGS. 3A and 3B are time-lapse images of a roadway that serve to illustrate an underlying concept related to this invention. Of particular note, the appearance of the reflections of the headlights from the roadway surface changes as the relative distance between the vehicles and the camera changes. Note, for example, that the intensity of the reflections from the headlights of the two lead vehicles in FIG. 3A is substantially diminished in FIG. 3B, whereas the intensity of the headlights are only slightly diminished. In a series of thresholded images, the reflections of the headlights will suddenly disappear, whereas the headlights will continue to appear in each image. Although all reflections are dependent upon the angle of incidence and reflection of the light on the surface relative to the location and field of view of the camera, the characteristic reflection pattern of headlights from a surface are also due to the specifically designed light pattern of vehicle headlights, as discussed below.

Figure 4A:
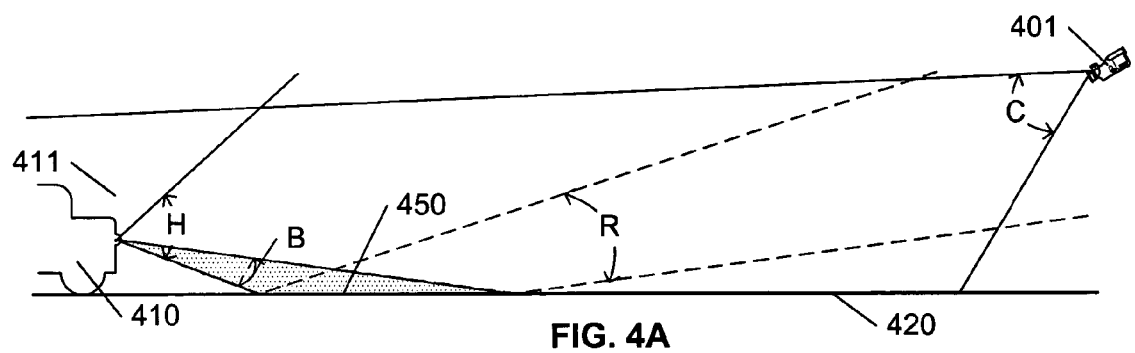
FIGS. 4A-4D illustrate an example partitioning of a camera's field of view to minimize the effects of reflection in accordance with this invention.

FIG. 4A illustrates a diagram of light paths in an example vehicle tracking system. A vehicle 410 with a headlight 411 is illustrated on a section of roadway 420 that is monitored by a camera 401. As is known in the art, a vehicle headlight is designed to project a relatively intense "beam" of light that is aimed toward the ground a distance ahead of the vehicle, as illustrated by the shaded angular segment B in FIG. 4A and the corresponding reflection area 450 of the roadway 420. The headlight 411 also projects a wider, but less intense, cone of light ahead of the vehicle, as illustrated by the angular segment H.

The reflection of the intense beam B from the reflection area 450 is illustrated by the segment R, and it is this reflection R that causes the bright reflections in each of the images 1A, 2A, 3A, below the image of each vehicle. The camera 401 is located such that its field of view, illustrated by angular segment C, includes both the headlight projection H and the reflected projection R, and thus the image from the camera 401 shows bright areas corresponding to the headlight 411 as well as the reflection area 450.

Figure 4B:
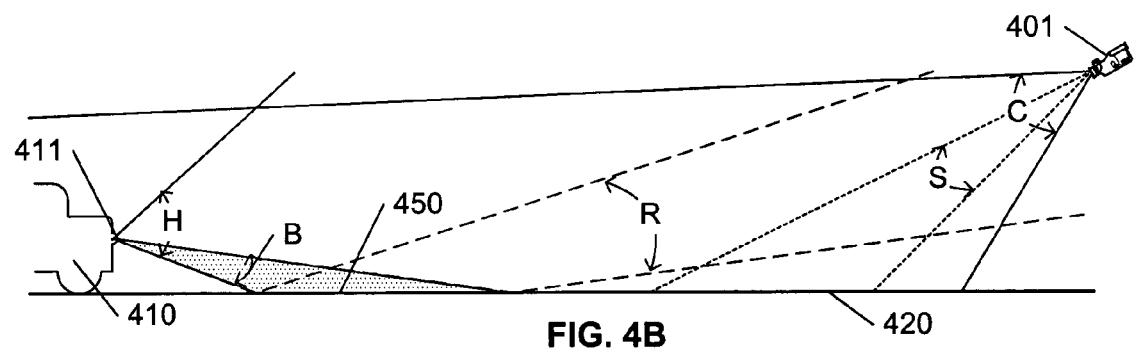
Figure 4C:
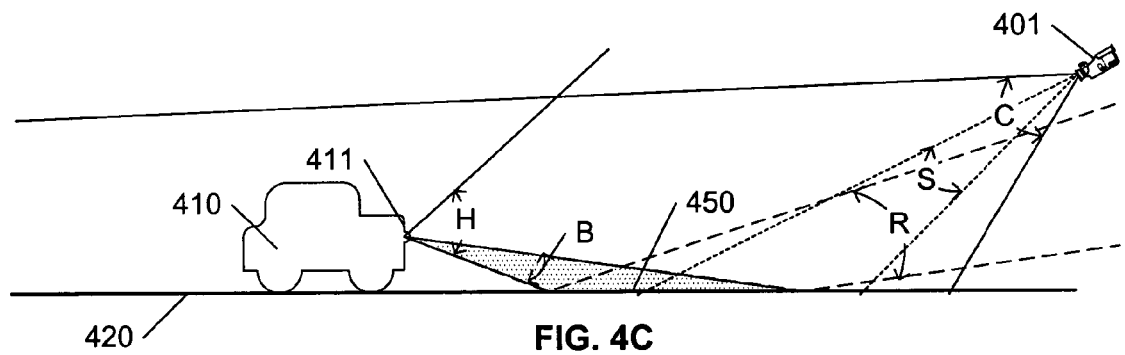

FIG. 4C illustrates a progression of the vehicle 410 relative to the camera 401. At the position illustrated, the camera 401 is no longer within the projection R from the reflected intense beam B of the headlight 411 from the reflection area 450. As such, the intensity of the reflection area 450 that is illuminated by the beam B in the image of the camera 401 will be substantially diminished, corresponding to the diminished reflections of FIG. 3B compared to FIG. 3A as the lead vehicles progress toward the camera. That is, even though the camera's field of view C in FIG. 4C includes the reflection area 450 that is brightly illuminated by the vehicle's headlight, the angle of incidence and reflection of the beam B from the headlight does not allow the intense reflected light to reach the camera 401, and the camera 401 only detects the scattered light from the reflection area 450, and not the directly reflected light contained in projection R. Because the illumination of the reflection area 450 in FIG. 4C is substantially reduced, the aforementioned thresholding technique will effectively eliminate the appearance of this reflection area 450 in the thresholded image. Conversely, the camera 401 remains within the projection H of the headlight 411, and thus the intensity of the image of the headlight 411 will remain high, and the image of the headlight 411 will remain in the thresholded image.

In accordance with a first embodiment of this invention, a vehicle identification system tracks the path of each illumination pattern in a series of images, as illustrated by the tracks 310 and 320 in FIGS. 3A and 3B. Illumination patterns that disappear prematurely, corresponding to the camera 401 being outside the projection R from the directly reflected light from the roadway surface, are identified as reflections, and subsequently ignored. Track 310 in FIG. 3A illustrates a typical track 310 of a reflection pattern; the end 311 of the track 310 occurring when the reflection is insufficient to exceed a given threshold value. Track 320 in FIG. 3B, on the other hand, illustrates the track of an illumination pattern that exhibits a relatively continuous pattern, having an intensity above the given threshold value for most of the field of view of the camera. Generally, headlight patterns will exhibit a track similar to track 320, with tracks that end 321 near or at the edge of the camera's field of view, whereas reflections will exhibit a truncated track similar to 310, with tracks that end 311 substantially sooner than the companion headlight tracks. Thus, in accordance with this aspect of the invention, the characteristics of the track, and particularly the track length, can be used to distinguish reflections from headlights.

Figure 5:
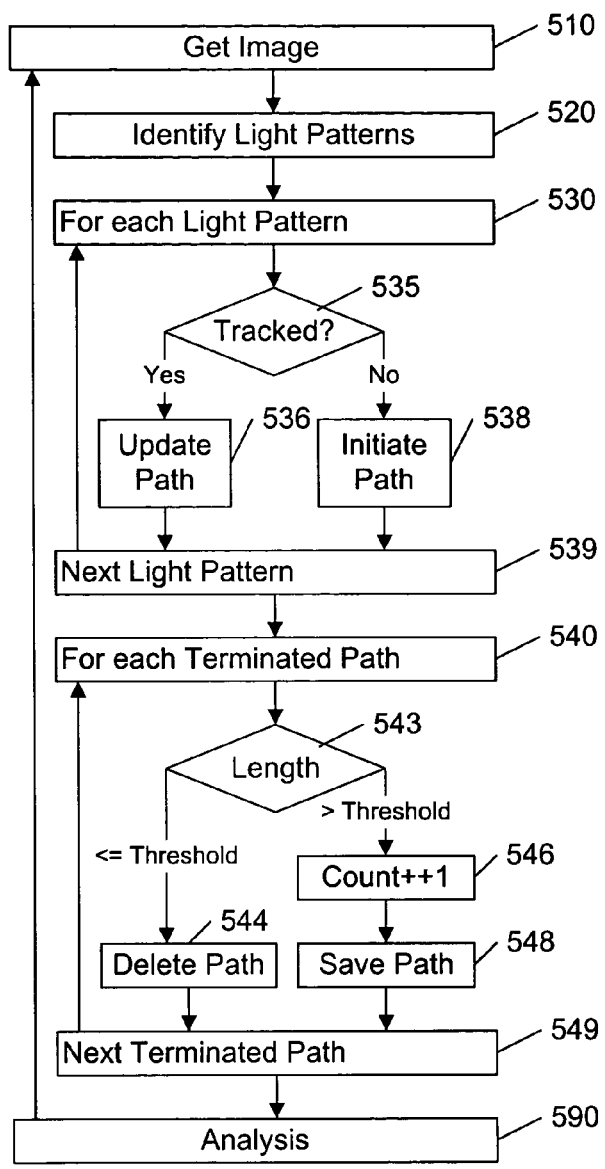
FIG. 5 illustrates an example flow diagram of a traffic analysis system in accordance with a first aspect of this invention.

FIG. 5 illustrates an example flow diagram of a traffic analysis system in accordance with this first aspect of the invention.

At 510, an image is received, and at 520, the light patterns within the image are identified. As noted above, thresholding techniques may be used to identify only those light patterns that exceed a given threshold. Pattern matching techniques can also be applied to distinguish headlight patterns, such as recognizing characteristic sizes and shapes of headlight patterns, to distinguish headlights from other vehicle lights as well as from reflections, to further improve the reliability of vehicle identification based on headlight patterns. Thereafter, combinations of headlight patterns can be associated with each vehicle using further conventional pattern matching techniques, including, for example, rules that are based on consistency of movement among patterns, to pair patterns corresponding to a vehicle, as well as rules that are based on the distance between such consistently moving patterns, to distinguish among multiple vehicles traveling at the same rate of speed. Because headlight patterns generally appear in pairs for each vehicle, the pattern matching process may be configured to identify each pair of consistently moving headlight patterns as a vehicle, and then apply other techniques on an 'exception' basis when ambiguities are indicated, to improve the processing time for identifying vehicles. That is, for example, a motor-cycle identifying technique may only be invoked when an odd number of headlight patterns are detected; techniques that identify vehicles having more than two headlights need only be invoked when the distances between headlights are out of the ordinary; and so on.

As is evident from FIG. 2B, however, the high-intensity reflections are often indistinguishable from headlights, and further processing is provided to improve the reliability of the vehicle identification process.

Each identified light pattern, or potential headlight pattern, is processed via the loop 530-539 to create and/or update a path associated with each pattern. At 535, a tracking process determines whether the particular light pattern is currently being tracked. In conventional tracking processes, for example, the current image is compared to an immediately prior image, and patterns in the current image that correspond to a slight offset from the prior image are assumed to be light patterns corresponding to the same object. If the light pattern does not correspond to a prior light pattern, a new path is created, at 538; if the light pattern corresponds to a prior light pattern, the existing path is updated, at 536.

After processing each identified light pattern to create or update its path, the existing paths that have not been updated are processed as "terminated" paths, via the loop 540-549. At 543, the length of the path is determined. If the length is less than a threshold length that is defined to distinguish between headlights 411 and the reflections 450 of the intense beams of the headlights, as detailed in FIGS. 3A-3B and 4A-4D, the light pattern is determined to be a reflection, and its path is deleted, at 544. If, at 543, the path length is greater than the threshold length, the light pattern is determined to be a true headlight pattern, and a vehicle count is incremented, at 546, and the path is optionally saved for further processing, at 548. Thus, by comparing the lengths of the paths created by light patterns in a sequence of images, vehicle headlights can be distinguished from reflections of the headlights.

At 590, any additional processing for traffic analysis is performed, and the process is repeated by obtaining and processing the next image, via the loop 510-590.

Figure 6:
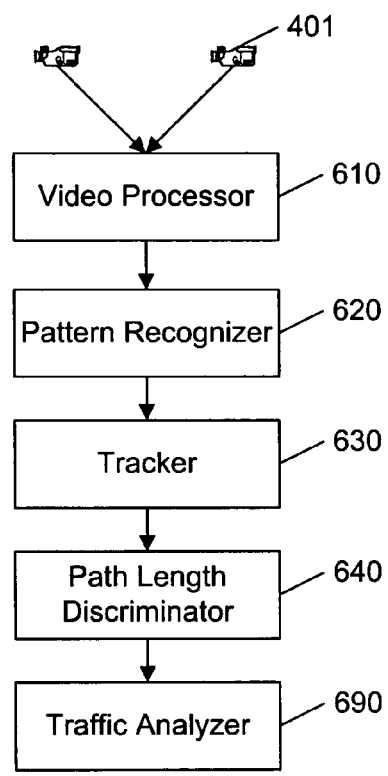
FIG. 6 illustrates an example block diagram of a traffic analysis system in accordance with the first aspect of this invention.

FIG. 6 illustrates an example block diagram of a traffic analysis system in accordance with this first aspect of this invention. Conventional video cameras 401 provide images to a video processor 610. These images are provided to a pattern recognizer 620 that is configured to identified distinguishable light patterns that may correspond to headlight patterns. A tracker 630 associates the light patterns to the paths of prior tracked objects and/or initiates new paths. A path length discriminator 640 identifies the length of each terminated path, i.e. an existing path that does not have a corresponding light pattern in the current image. As is known in the art, filtering techniques may be used to affirm the absence of a corresponding light pattern based on multiple sequential images. The path length discriminator 640 eliminates paths that terminate 'prematurely', compared to a defined threshold path length of a true vehicle headlight pattern's path, and thereby provides for a count of light patterns that actually correspond to the vehicle headlights. Optionally, a traffic analyzer 690 provides further traffic analyses, based on the paths of the identified vehicle headlights.

Also optionally, pattern matching techniques may also be applied to remove the illumination patterns corresponding to the identified prematurely disappearing patterns from prior images, so as to produce a series of images that clearly illustrate the vehicle headlight patterns without the high-intensity reflections.

Figure 4D:
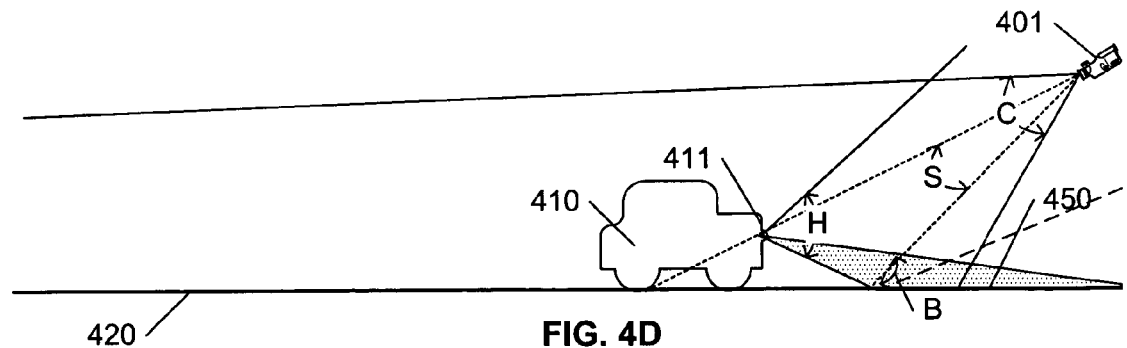

FIGS. 4B-4D also illustrate a further vehicle identification technique that takes advantage of the distinctive characteristics of vehicle headlights to facilitate the identification of vehicles in accordance with another aspect of this invention. In FIG. 4B, the vehicle 410 and camera 401 are as illustrated in FIG. 4A, wherein the camera 401 is within the projection R of the intense beam B from the headlight 411, and thus will receive a relatively high-intensity image of the reflection area 450.

Illustrated in FIG. 4B is an angular segment S of the camera's field of view C. Note that angular segment S does not include the reflection area 450 while the camera 401 is within the projection R. As illustrated in FIG. 4C, the angular segment S does include the reflection area 450 as the vehicle 410 approaches the camera 401, but, as discussed above, FIG. 4C illustrates the camera 401 outside the projection R, and thus the image of the reflection area 450 will not be intense. In FIG. 4D the headlight 411 is within the segment S, and, because the camera 401 is still within the broader projection H from the headlight 411, the image of the headlight 411 will be intense. The segment S could correspond to a narrowing of the field of view C of the camera 401 to the bounds of the angular segment S, but such a narrowing of the field of view of the camera 401 may limit the camera's use for other traffic monitoring purposes. Preferably, the segment S corresponds to a partitioning of the image from the camera 401 to provide a recognition zone in the image corresponding to the segment S, as discussed further below.

As illustrated, by properly arranging the segment S relative to the reflected area 450 and corresponding projection R and headlight projection H, the image from the camera 401 within segment S will not show intense reflections from the headlight beam B, regardless of the location of the vehicle 410 relative to the camera 401, yet will show an intense image of the headlight 411. Thus, by specifically processing the images within segment S from the camera 401, vehicles can be reliably distinguished by recognizing headlight patterns, without the interference and errors typically associated with headlight reflections.

Figure 7:
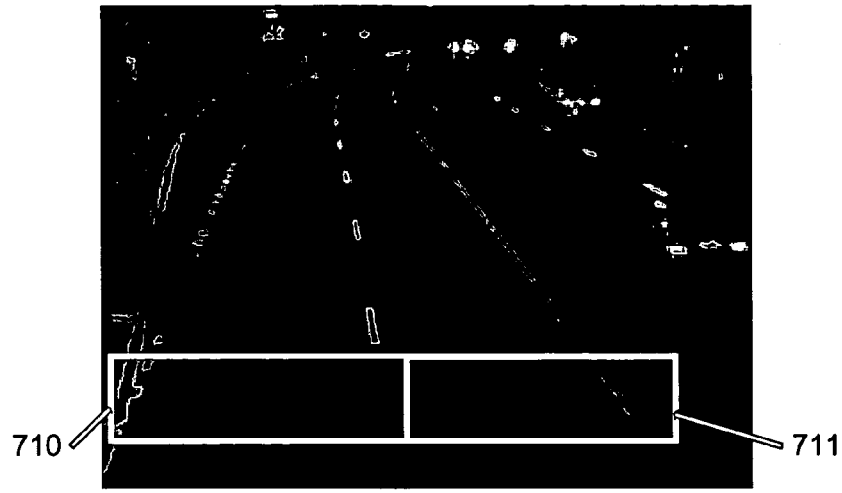
FIG. 7 illustrates an example image with an identification of an example partition of a camera's field of view in accordance with this invention.

FIG. 7 illustrates an example image with example partitions corresponding to a segmentation of a camera's field of view in accordance with this invention. A region of the camera image is identified, hereinafter termed a recognition zone 710, within which headlight-recognition techniques are applied to distinguish vehicles. In accordance with this invention, the recognition zone 710 corresponds to a segment of the camera's field of view in which headlight reflections are substantially diminished, due to the angle of incidence and reflection of the intense headlight beam relative to the camera location, as discussed above. The recognition zone 710 can be determined mathematically, based on the principles presented in FIGS. 4A-4D, or it can be determined heuristically, by reviewing images of actual traffic flow to determine a region corresponding to the camera being outside the segment of direct reflection from the headlight beam, yet within the segment of projection from the headlight. To facilitate traffic analysis, multiple recognition zones 710, 711 may be defined within a camera image, for example, to count the number of vehicles traveling in each lane of a roadway. Alternatively, one recognition zone could span multiple lanes of the roadway, and the location of the recognized headlights within the zone can be used to identify the lane in which the vehicle is traveling.

Figure 8:
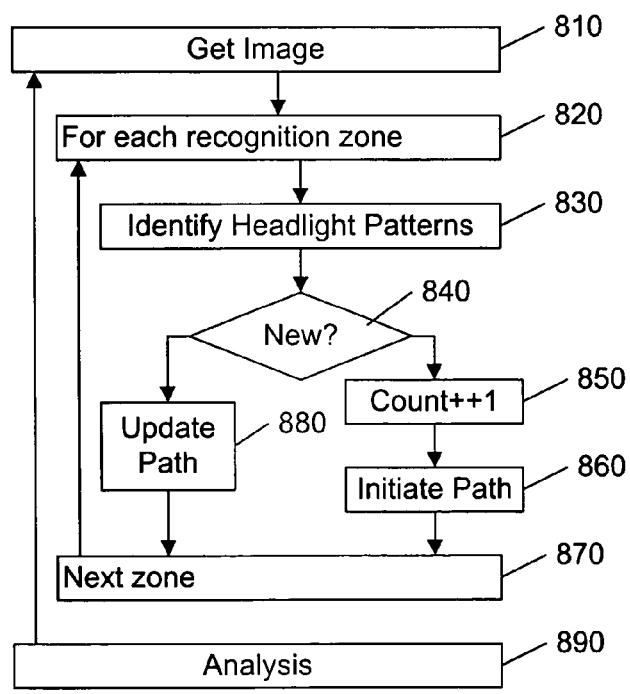
FIG. 8 illustrates an example flow diagram for a traffic analysis system in accordance with a second aspect of this invention.

FIG. 8 illustrates an example flow diagram of a traffic analysis system in accordance with this invention. At 810, an image is received from a camera. Within the loop 820-880, the region of the image corresponding to each recognition zone is processed to distinguish each new vehicle entering the recognition zone.

At 830, headlight patterns are identified, using conventional techniques, such as thresholding and pattern recognition, as discussed above. Because each recognition zone is defined as a segment of the field of view of the camera in which direct reflections from headlight beams do not appear, and direct projections from the headlights do appear, the use of conventional thresholding and pattern recognition techniques can be expected to provide highly reliable results.

If, at 840, the recognized headlights do not correspond to recognized headlights in prior images, thereby indicating the arrival of a new vehicle in the recognition zone, a vehicle count is incremented, at 850.

Optionally, if the traffic analysis includes speed or direction analysis, a path of the new vehicle can be identified at 860, by processing prior images from the camera, using conventional tracking techniques. Note that the images of the corresponding headlights in prior images will be located in regions outside the recognition zone used to initially distinguish the vehicle, and these regions will include the direct reflections of the headlight beams. However, because the headlights are distinguished in the recognition zone, tracing these identified headlights back through prior image frames will be relatively straightforward, and relatively unaffected by the appearance of reflections in these prior image frames.

If, at 840, the recognized headlights correspond to recognized headlights in prior images, the path of the recognized headlights is updated, at 870. Even if the traffic analysis does not include vehicle tracking, this updating of the path of the recognized headlights facilitates distinguishing between previously recognized headlights and new headlights in subsequent image frames. That is, by updating the location of a recognized headlight with each frame, the corresponding appearance of the same headlight in a subsequent frame can be ascertained based on the relative motion of the image of the headlight between frames.

After each recognition zone is processed for identifying the occurrence of new vehicles via the loop 830-880, the information is provided to an analysis process 890, either directly, or by storing the information for subsequent processing, and the next image frame is processed, by looping back to 810. The analysis process 890 could be as simple as a report mechanism that reports the number of vehicles detected within a given time period, or the number of vehicles within each lane within a given time period. In some systems, the information gathered from multiple vehicle monitoring stations are combined to provide detailed analyses of traffic patterns, problem assessments, and so on. Because the system of this invention is able to use the same video cameras and the same processing equipment as would typically be used for monitoring traffic during daylight conditions, this invention can easily be integrated into existing daylight-only systems to provide continuous traffic monitoring capabilities.

Figure 9:
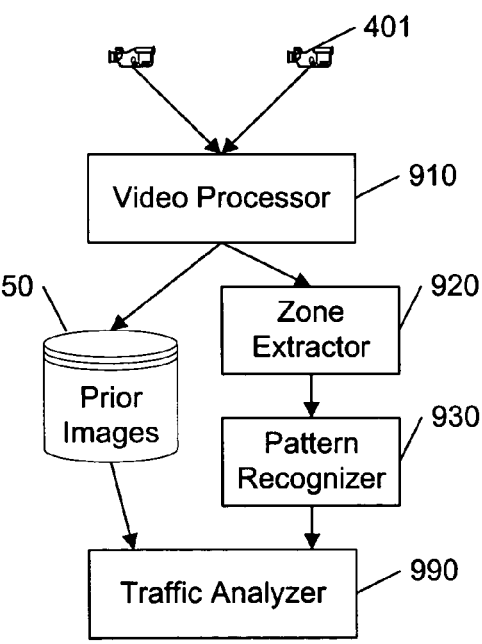
FIG. 9 illustrates an example block diagram of a traffic analysis system in accordance with the second aspect of this invention.

FIG. 9 illustrates an example block diagram of a traffic analysis system in accordance with this invention. Video cameras 401 are deployed to collect images of portions of roadways, such as illustrated in FIGS. 1A, 2A, 3A, 3B, and 7. A video processing system 910 receives these images. In accordance with this invention, a zone extractor 920 extracts subimages from the image provided by the cameras 401 corresponding to recognition zones, as discussed above. In a preferred embodiment of this invention, the zone extractor 920 is integrated with the same video processing system 910 that is used for traffic monitoring and analysis during daylight hours, and is selectively enabled, based on the time of day or a measure of the current visibility at the monitored roadway, to provide continuous traffic monitoring capabilities.

A pattern recognizer 930 is configured to recognize headlight patterns within the recognition zone sub-images, and to thereby distinguish each vehicle that enters each recognition zone. As noted above, the pattern recognizer 930 may also be configured to back-track through prior images 950 to identify the track of each distinguished vehicle, and to update such tracks as subsequent images are processed.

A traffic analyzer module 990 processes the information provided by the pattern recognizer 930, to provide, for example, traffic flow reports that include the number of vehicles traveling on the roadway during select time periods.

One of ordinary skill in the art will recognize that the above described techniques can be combined in a variety of ways. For example, the aforementioned forward-tracking scheme that tracks headlights and reflections, and then distinguishes reflections when the forward track abruptly ends, can be used to identify potential targets as they enter the recognition zone. In this manner, the tracking of identified vehicles will not require the aforementioned back-tracking process, thereby minimizing or obviating the need to store prior images. Similarly, until a potential target enters the recognition zone, the detailed recognition systems need not be invoked, thereby saving processing time.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:
1. A traffic monitoring system comprising:
a video processor that is configured to receive an image from a camera having a field of view that includes a roadway, and
a pattern recognizer that is configured to identify headlight patterns in a recognition zone within the image, and to thereby distinguish vehicles within the recognition zone;
wherein
the vehicles include headlights that are characterized as producing
a broad segment of projected light and
a narrower segment of higher intensity light;
the recognition zone corresponds to a segment of a field of view of the camera wherein reflected light received from reflection areas that are illuminated by the narrower segment of higher intensity light is substantially diminished and
the projected light from the headlights is received directly; and the headlight patterns correspond to the projected light from the headlights wherein the pattern recognizer distinguishes by counting only newly identified vehicles within the recognition zone.

2. The traffic monitoring system of claim 1, further comprising:
a zone extractor that is configured to extract a sub-image from the image corresponding to the recognition zone.

3. The traffic monitoring system of claim 1, further comprising a memory for storing prior images from the camera, and
wherein
the pattern recognizer is further configured to track a path of each of the vehicles based on corresponding headlight patterns in the prior images.

4. The traffic monitoring system of claim 1, wherein
the pattern recognizer is further configured to increment a count for each identified new headlight pattern, corresponding to a newly distinguished vehicle.

5. The traffic monitoring system of claim 1, wherein the segment of the field of view of the camera:
does not include reflection area when the camera is within a predominant path of the reflected light from the reflection area, and
includes the reflection area when the camera is not within the predominant pateht of the reflected light from the reflection are.

6. The traffic monitoring system of claim 1, further including
a traffic analyzer that is configured to provide traffic analysis information based on information received from the pattern recognizer regarding distinguished vehicles.

7. The traffic monitoring system of claim 1, wherein the pattern recognizer is further configured to:
identify light patterns within the image, and
identify combinations of light patterns within the image that are consistent with characteristics of vehicle headlights, including at least one of:
a distance between the light patterns, and
a pairing of light patterns based on a consistent track of each of a pair of light patterns.

8. A method of detecting a vehicle, comprising:
receiving an image from a camera having a field of view that includes a roadway, identifying one or more headlight patterns within a recognition zone of the image, detecting the vehicle based on the one or more headlight patterns; and counting only newly identified vehicles within the recoanition zone wherein
the vehicle includes headlights that are characterized as producing a broad segment of projected light and
a narrower segment of higher intensity light; and
the recognition zone corresponds to a segment of the field of view of the camera wherein reflected light received from a reflection area of the roadway that is illuminated by the narrower segment of higher intensity light is substantially diminished, and the projected light is received directly.

9. The method of claim 8, wherein
detecting the vehicle includes identifying a newly occurring headlight pattern in the one or more headlight patterns.

10. The method of claim 8, wherein the segment of he field of view of the camera:
does not include the reflection area when the camera is within a predominant path of the reflected light from the reflection area, and
includes the reflection area when the camera is not within the predominant path of the reflected light from the reflection area.

11. The method of claim 8, further including
determining a path of the vehicle based on prior images from the camera.

12. The method of claim 8, further including incrementing a count when the vehicle is detected.

13. The method of claim 8, further including
detecting other vehicles based on the one or more headlight patterns, and providing one or more traffic analysis reports based on the detected vehicles.

14. A computer program embodied on a computer readable medium for execution on a processing device that causes the processing device to:
identify illumination patterns in a series of images from a video camera,
determining a length of tracks of the illumination patterns in the series of images and
distinguish vehicles from reflections by comparing the determined length of the tracks of the illumination patterns in the series of images with a threshold value.

15. The computer program of claim 14, wherein
the vehicles are distinguished from the reflections based on a length of each track.

16. The computer program of claim 14, wherein
the vehicles are distinguished from the reflections by identifying patterns within an identification region that is beyond an extent of the tracks of the illumination patterns of the reflections in a field of view of the video camera.

17. The traffic monitoring system of claim 1, including:
a tracking system that is configured to identify tracks of illumination patterns within a sequence of images from the video processor, and
a reflection detector that is configured to distinguish illumination patterns that correspond to reflections, based on the tracks of the illumination patterns.

18. The traffic monitoring system of claim 17, wherein
the tracks of the illumination patterns that correspond to reflections are substantially shorter than the tracks of illumination patterns that correspond to vehicle headlights.

19. The traffic monitoring system of claim 17, wherein
the tracks of the illumination patterns that correspond to reflections end substantially before the recognition zone.

20. The traffic monitoring system of claim 17, wherein the tracking system includes
a threshold detector that identifies the illumination patterns as patterns in each image of the sequence of images that exceed a threshold luminance level.

21. The method of claim 8, including:
maintaining one or more tracks corresponding to a series of consistent illumination patterns from a series of images from the camera, and
distinguishing an illumination pattern corresponding to the vehicle from an other illumination pattern corresponding to reflected light received from the reflection area of the roadway that is illuminated by the narrower segment of higher intensity light based on a length of the track of the other illumination pattern.

22. The method of claim 21, wherein maintaining the one or more tracks includes:
identifying an illumination pattern in a current image from the video camera corresponding to headlights of the vehicle, and identifying a similar illumination pattern in a prior image from the video camera.

23. The method of claim 21, wherein
the track of the other illumination pattern that corresponds to the reflection ends substantially before the recognition zone.

24. The method of claim 21, including identifying the illumination pattern and the other illumination pattern as patterns in each image of the sequence of images that exceed a threshold luminance level.

25. A traffic monitoring system comprising:
a video processor that is configured to receive a sequence of images from a camera having a field of view that includes a roadway,
a tracking system that is configured to identify determine a length of tracks of illumination patterns within the sequence of images, and
a reflection detector that is configured to distinguish illumination patterns that correspond to reflections, by comparing the determined length of the tracks of the illumination patterns with a threshold value.

26. The traffic monitoring system of claim 25, wherein
the tracks of the illumination patters that correspond to reflections are substantially shorter than the tracks of illumination patterns that correspond to vehicle headlights.

27. The traffic monitoring system of claim 25, wherein
the tracks of the illumination patterns that correspond to reflections end substantially before an edge of the field of view of the camera.

28. The traffic monitoring system of claim 25, wherein the tracking system includes
a threshold detector that identifies the illumination patterns as patterns in each image of the sequence of images that exceed a threshold luminance level.

29. A method of detecting vehicles, comprising:
maintaining one or more tracks corresponding to a series of consistent illumination patterns from a series of images from a video camera,
determining a length of the one or more tracks with a threshold value, and
distinguishing each illumination pattern corresponding to each vehicle from each illumination pattern corresponding to each reflection from each vehicle by comparing the determined length of each of the one or more tracks with a threshold value.

30. The method of claim 29, wherein maintaining the one or more tracks includes:
identifying an illumination pattern in a current image from the video camera corresponding to vehicle headlights, and
identifying a similar illumination pattern in a prior image from the video camera.

31. The method of claim 29, wherein
the tracks of the illumination patterns that correspond to reflections end substantially before an edge of the field of view of the camera.

32. The method of claim 29, further including
identifying the illumination patterns as patterns in each image of the sequence of images that exceed a threshold luminance level.

* * * * *